United States Patent [19]

Oha

[11] Patent Number: 5,185,501
[45] Date of Patent: Feb. 9, 1993

[54] CABLE SHIELD STRIP

[76] Inventor: Chi-Chih Oha, No. 106, Chien Teh Rd., San Min Dist., Kaohsiung, Taiwan

[21] Appl. No.: 672,492

[22] Filed: Mar. 20, 1991

[51] Int. Cl.⁵ .................... H01B 7/24; H02G 3/04
[52] U.S. Cl. ................ 174/136; 174/68.1; 174/48; 174/70 C; 174/135; 174/68.3
[58] Field of Search ......... 174/48, 68.1, 70 C, 174/72 C, 117 A, 135, 136, 68.3; 52/287

[56] References Cited

U.S. PATENT DOCUMENTS 3,524,921  8/1970  Wolf ........................ 174/70 C
4,454,374  6/1984  Pollack ...................... 174/68.1

Primary Examiner—Leo P. Picard
Assistant Examiner—Hyung S. Sough
Attorney, Agent, or Firm—Pro-Techtor International

[57] ABSTRACT

A Cable shield strip made of a flexible plastic, shaped as H, U or G and having a horizontal shield strip with a layer of adhesive on its bottom surface to flexibly wrap up a cable and two fixing strips fused with both ends of the shield strip and having their outer surfaces adhered with an adhesive strips coated with a layer of adhesive on both surfaces to be adhered on a flat surface of a wall or a floor which a cable is fixed on.

4 Claims, 3 Drawing Sheets

CABLE SHIELD STRIP

BACKGROUND OF THE INVENTION

A wire or a cable is usually fixed on a wall or a floor by means of wire staples, nails, hooks, hangers, etc., without any shielding or protective means. The wire or cable is therefore apt to be damaged, and its outer cover weathered, in that it may be exposed to sunlight, rain, etc.

SUMMARY OF THE INVENTION

This invention has been made with the object of protecting a wire or a cable after it is fixed on a wall or a floor, enclosing it completely with a flexible and water-resistant material.

The cable shield strip of the present invention is made of a flexible plastic and has an H, U or G shape. The cable shield strip is formed from a central shield strip flanked by two fixing strips which are fused by heat to both sides of the shield strip. The cable shield strip is made by an injection molding process.

The bottom surface of the shield strip is coated with a layer of adhesive. The shield strip covers and adheres to the outer surface of a cable or a wire when the cable shield strip is in use.

The two fixing strips are made from plastic which is slightly more rigid than the plastic used in the shield strip. The outer surfaces of the fixing strips are coated with a layer of adhesive so as to adhere to a flat or almost flat surface such as the wall or the floor where a cable is fixed.

When the cable shield strip is to be packed, stored or transported, it can be folded flat, with the two fixing strips being folded down on the upper surface of the shield strip so as to protect the softer central shield strip.

DETAILED DESCRIPTION OF THE INVENTION

The first embodiment A of the cable shield strip of the present invention, as shown in FIGS. 1-6, is H-shaped, comprising a horizontal shield strip 1 made of a soft thin plastic sheet, and two vertical fixing strips 21, 22 made from plastic which is slightly more rigid than that of the shield strip 1. The shield strip 1 and the fixing strips 21 and 22 are fused together by heat during an injection molding process.

The fixing strips 21, 22 have on their outer surfaces adhesive strips 31, 32 coated with an adhesive on both surfaces and the shield strip 1 has its bottom surface coated with a layer of adhesive 4.

Figure 2:
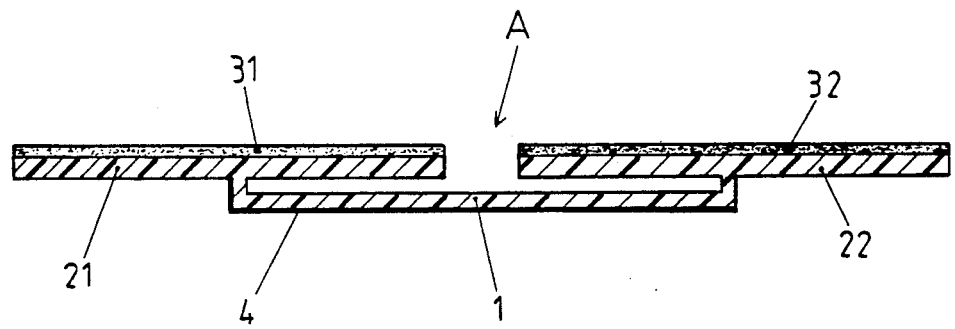
FIG. 2 is a cross-sectional view of the first embodiment of the cable shield strip folded flat.

The first embodiment A can be folded flat as shown in FIG. 2 by pushing the two fixing strips 21, 22 toward the upper surface of the shield strip 1 so that only the upper halves of the fixing strips are laid on the shield strip 1. In this configuration, the cable shield strip A can be conveniently packed, stored and transported.

Figure 3:
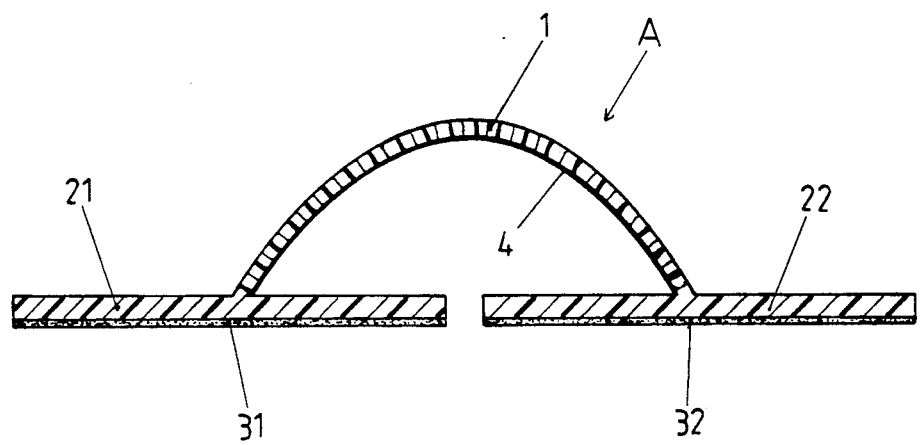
FIG. 3 is a cross-sectional view of the first embodiment of the present invention in a practical application.
Figure 1:
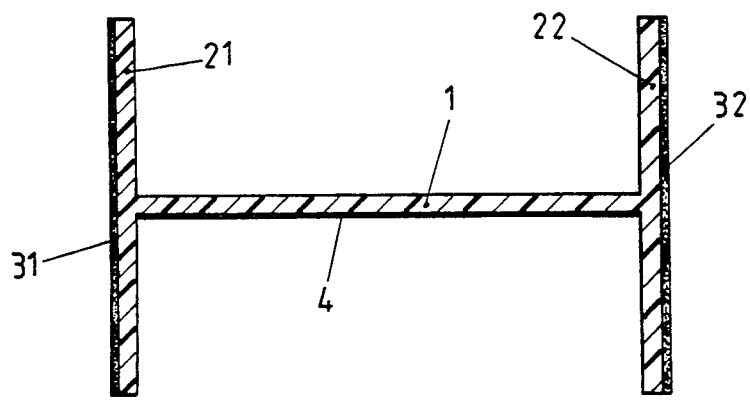
FIG. 1 is a cross-sectional view of the first embodiment of the cable shield strip in the present invention.

In practical use, the H-shaped cable shield strip A is folded out from the flat shape to the H-shape. The bottom surface of the shield strip 1 is wrapped around the wire or cable to be protected, and adheres to the wire or the cable due to the adhesive on the bottom surface of the shield strip 1. The two fixing strips 21, 22 are to be aligned in a straight line, so that the H-shape of the strip becomes a hat shape as shown in FIG. 3. The adhesive surfaces 31, 32 then adhere to the flat or almost flat surface of a wall or floor where the cable is to be fixed. The shield strip 1 is flexible enough to wrap around a cable of any size, and the fixing strips 21, 22 are also flexible enough to adhere to a surface that is not completely flat, the result being a fast fixing operation, good protection for the cable, and an decrease in cost.

Figure 8:
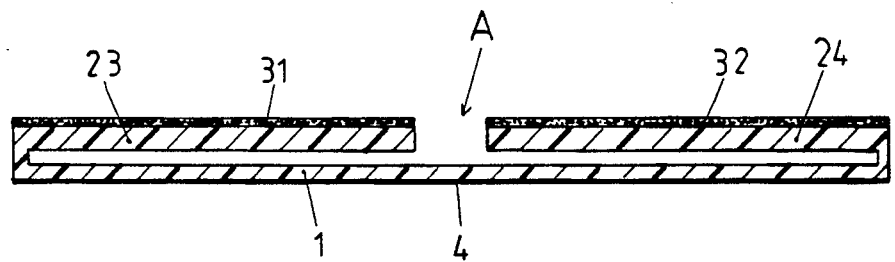
FIG. 8 is a cross-sectional view of the second embodiment folded for storage.
Figure 9:
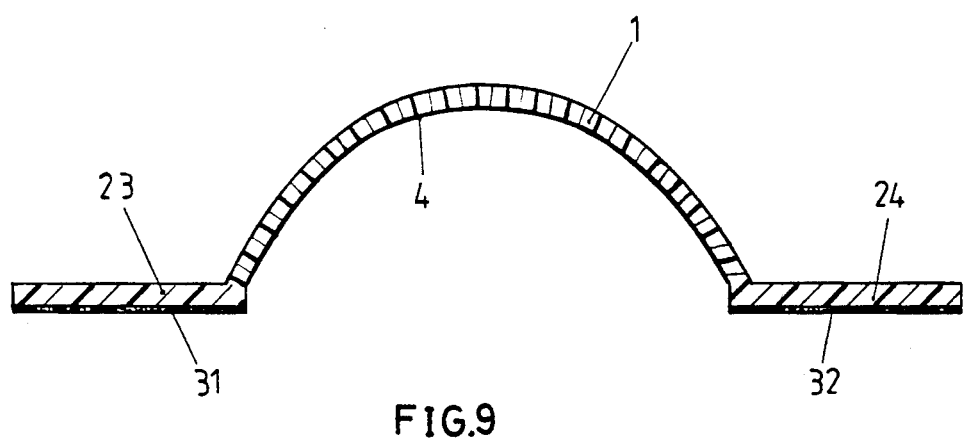
FIG. 9 is a cross-sectional view of a practical application of the second embodiment of the cable shield strip of the present invention.
Figure 7:
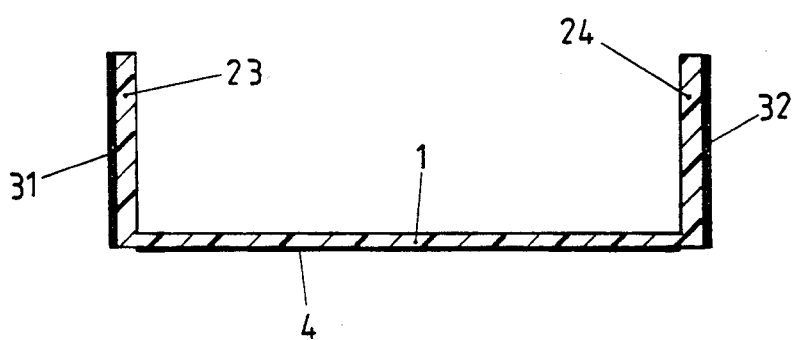
FIG. 7 is a cross-sectional view of the second embodiment of the cable shield strip of the present invention.

A second embodiment B of the cable shield strip of the present invention, as shown in FIGS. 7-9, has a U-shape, comprising a horizontal shield strip 1 and two vertical fixing strips 23, 24. The shield strip 1 also has a layer of adhesive o the bottom surface and the fixing strips 23, 24 have adhesive strips 31, 32 on their outer surfaces.

Figure 10:
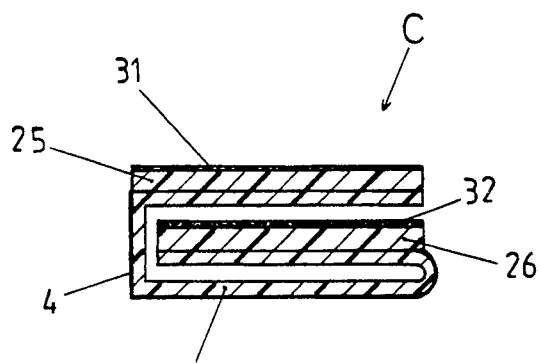
FIG. 10 is a cross-sectional view of the third embodiment of the cable shield strip of the present invention in its folded position.
Figure 4:
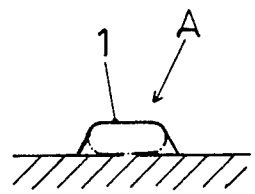
FIG. 4 is a cross-sectional view of another practical application of the first embodiment of the present invention.
Figure 5:
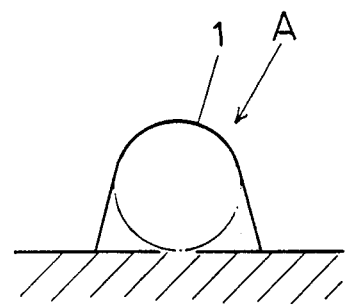
FIG. 5 is a cross-sectional view of another practical application of the first embodiment of the present invention.
Figure 6:
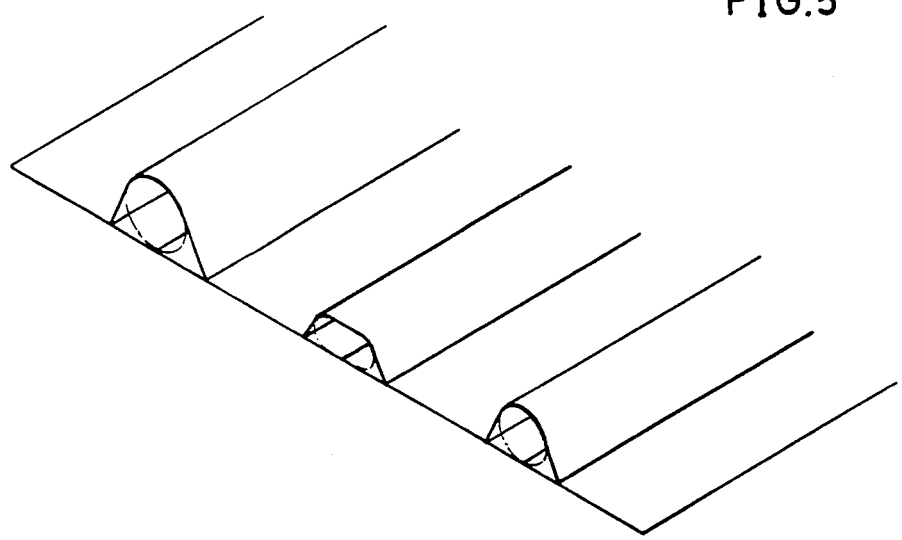
FIG. 6 is a perspective view of the first embodiment of the cable shield strip.

The third embodiment C of the cable shield strip of the present invention, as shown in FIG. 10, has a G-shape, comprising a shield strip 1, and two fixing strips 23, 24 or 25, 26 protecting the upper surface of the shield strip 1 from being harmed while this G-shaped cable shield strip C is folded for storing or transporting.

What is claimed is:

1. A cable shield strip comprising;

a central shield strip made of soft thin flexible plastic and having an adhesive layer on its bottom surface;

two fixing strips formed from plastic which is also flexible, but slightly more rigid than the central shield strip, the fixing strips being fused to both sides of the shield strip through an injection molding process to form an H shape, and the fixing strips having an adhesive layer on their attaching surfaces; and wherein the shield strip may be urged into a flat position and folded near the point that the fixing strips attach to the shield strip so that the fixing strips lie flat on the shield strip for packing, storing, or transporting; and when in use, the shield strip covers and protects a cable and adheres thereto due to its adhesive bottom surface and the two fixing strips being unfolded and adhering to the surface of a wall where the cable is to be positioned.

2. The cable shield strip of claim 1 wherein;

the fixing strips are attached to the shield strip at the midpoints of the fixing strips via heat fusion in an injection molding process so that the device has an H shape.

3. A cable shield strip comprising;

a central shield strip made of soft thin flexible plastic and having an adhesive layer on its bottom surface;

two fixing strips formed from plastic which is also flexible, but slightly more rigid than the central shield strip, the fixing strips being fused to both sides of the shield strip through an injection molding process to form a U shape, and the fixing strips having an adhesive layer on their attaching surfaces; and wherein the shield strip may be urged into a flat position and folded near the point that the fixing strips attach to the shield strip so that the fixing strips lie flat on the shield strip for packing, storing, or transporting; and when in use, the shield strip covers and protects a cable and adheres thereto due to its adhesive bottom surface and the two fixing strips being unfolded and adhering to the surface of a wall where the cable is to be positioned.

4. A cable shield strip comprising;

a central shield strip made of soft thin flexible plastic and having an adhesive layer on its bottom surface;

two fixing strips formed from plastic which is also flexible, but slightly more rigid than the central shield strip, the fixing strips being fused to both sides of the shield strip through an injection molding process to form a G shape, and the fixing strips having an adhesive layer on their attaching surfaces;

and when in use, the shield strip covers and protects a cable and adheres thereto due to its adhesive bottom surface and the two fixing strips being unfolded and adhering to the surface of a wall where the cable is to be positioned.

* * * * *